Patented Aug. 7, 1928.

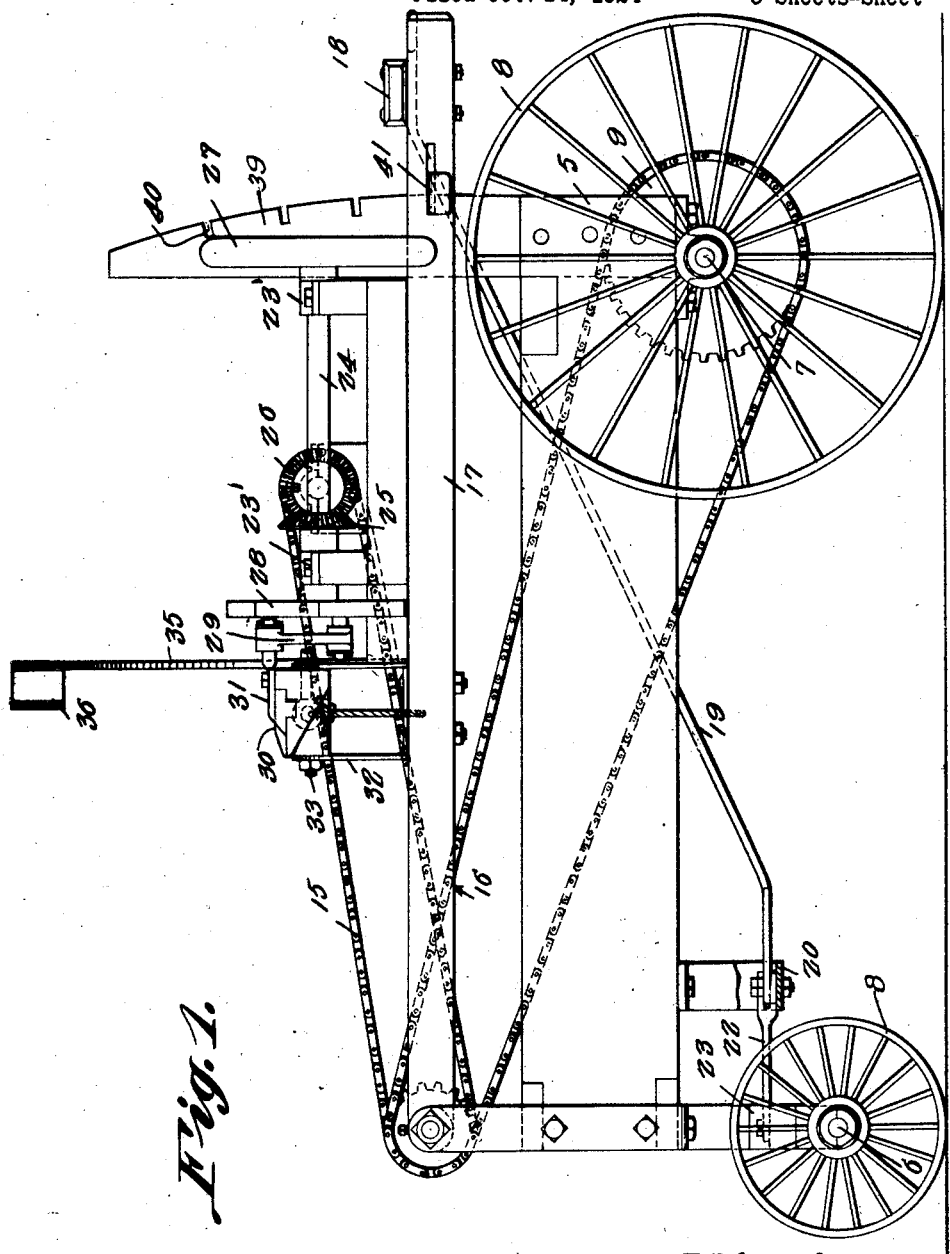

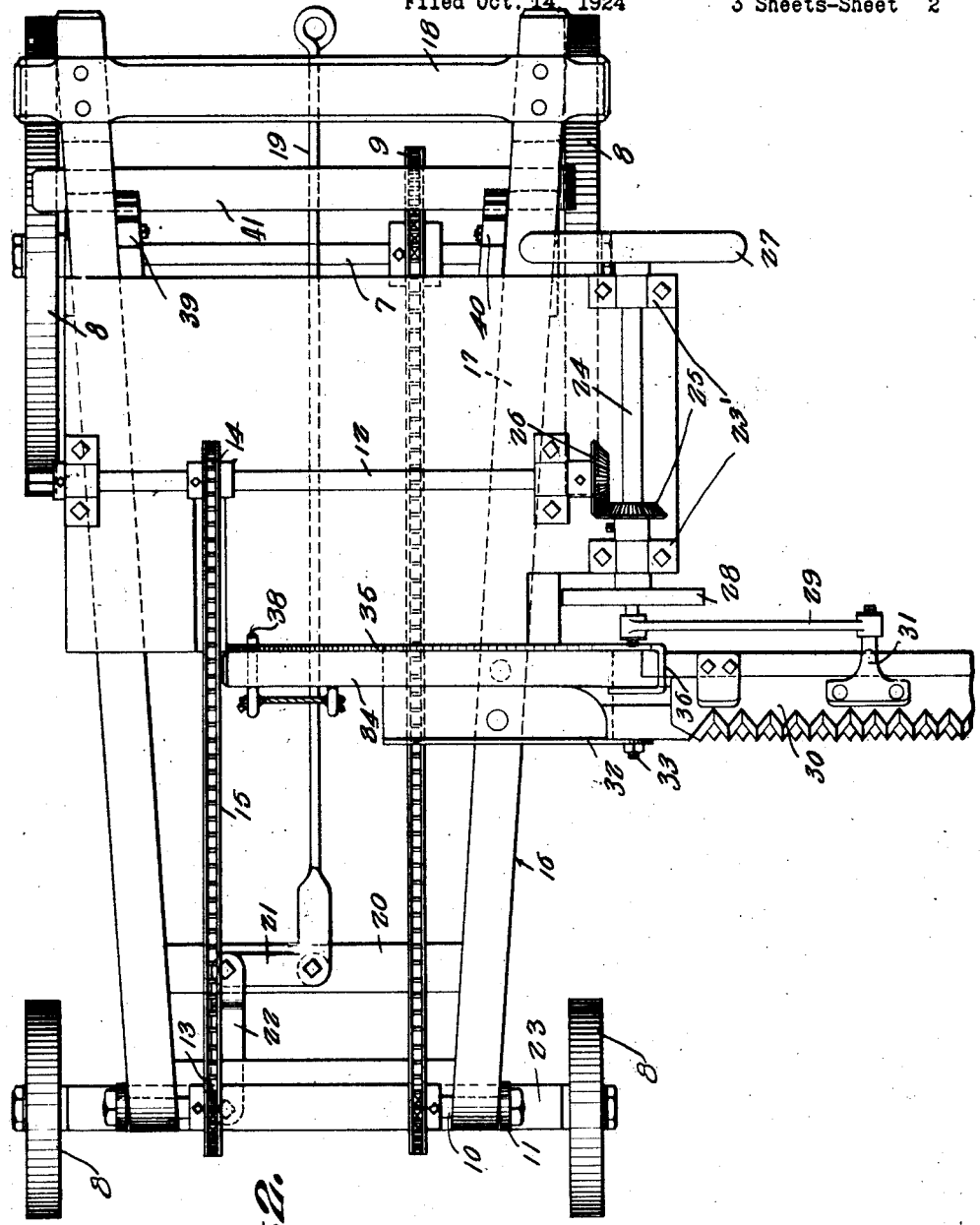

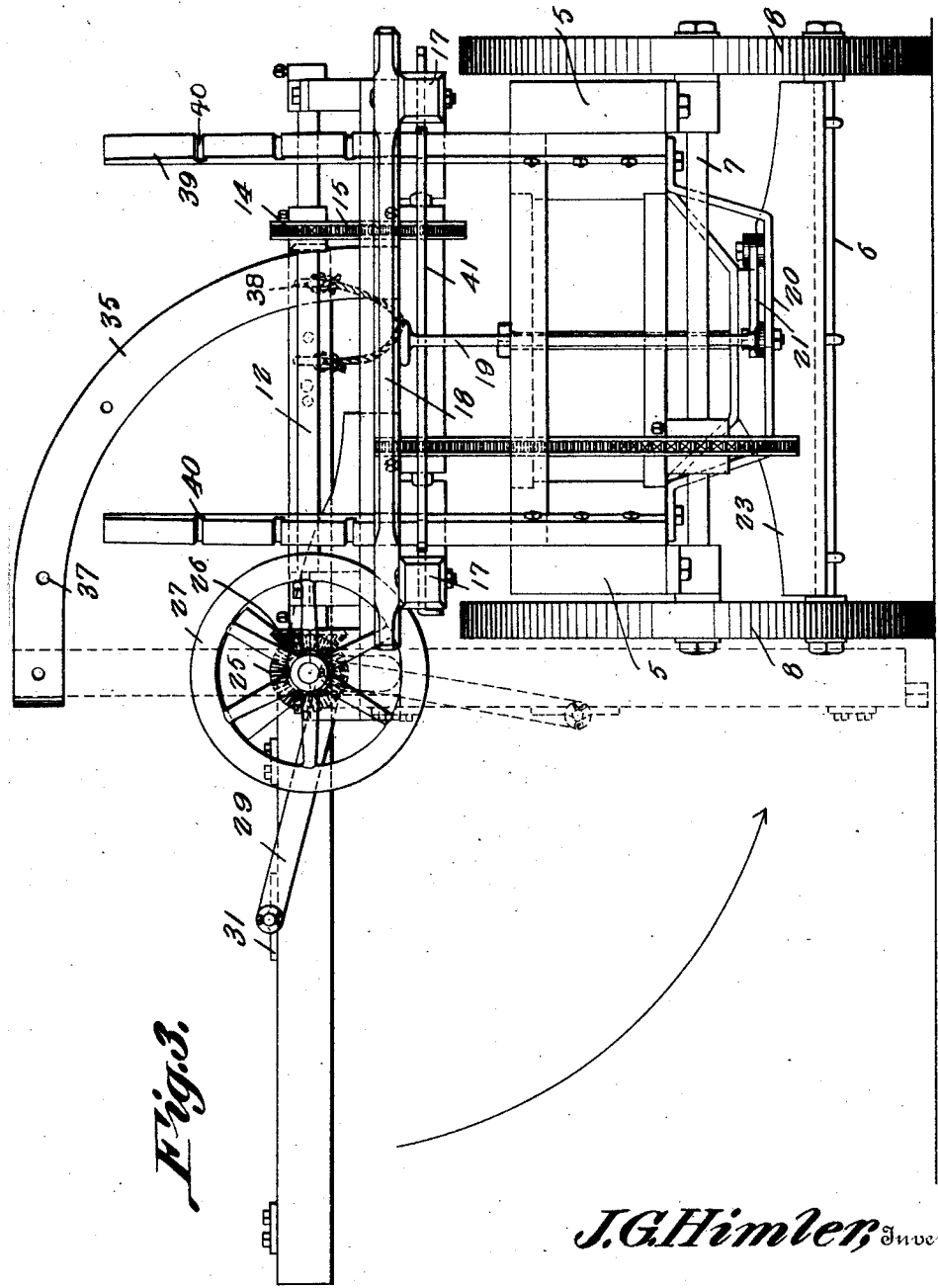

1,679,421

UNITED STATES PATENT OFFICE.

JOSEPH G. HIMLER, OF LATROBE, PENNSYLVANIA.

HEDGE TRIMMER.

Application filed October 14, 1924. Serial No. 743,567.

This invention relates to a machine for trimming hedges and aims to provide a machine which may be operated adjacent to a hedge in a manner to evenly cut the hedge.

An important object of the invention is to provide a machine of this character wherein the cutter bar thereof, may be moved to operate in a horizontal plane or a vertical plane so that the machine may be conveniently operated for trimming the sides as well as the top of the hedge.

Another object of the invention is to provide a hedge trimming machine wherein the cutting bar may be adjusted to operate at various heights.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a hedge cutting machine constructed in accordance with the invention.

Figure 2 is a plan view thereof.

Figure 3 is a rear elevational view of the machine.

Referring to the drawings in detail, the machine includes a body portion indicated generally by the reference character 5, which body portion is supported on the axles 6 and 7 respectively, on which the wheels 8 are mounted.

The wheels on the axle 7 are secured fast to the axle so as to revolve therewith. Mounted on the axle 7 is a sprocket 9 that transmits through sprocket chain 16 and sprocket 10' mounted on shaft 10 movement to said shaft mounted at the forward end of the body portion and operating in bearings 11, and which in turn transmits movement to the power shaft 12 through the sprockets 13 and 14 mounted on shafts 10 and 12 respectively and the chain 15 operating thereover.

The shaft 12 is carried by the pivoted frame indicated generally by the reference character 16 which frame includes side bars 17 that have their rear ends extending beyond the rear of the body of the machine where they are connected by the bar 18 that provides a handle for the machine and affords means whereby the machine may be manually moved.

Extending to a position adjacent to the handle 18 is a steering rod 19 of which the forward portion ends in a bell crank pivotally connected as at 19' to the bar 20 that is supported under the frame, one portion of said bell crank extending at right angles to the other as at 21 where it has pivotal connection as at 20' with the guiding link 22 which is pivotally connected as at 21' with the support 23 that carries the front axle 6. Thus it will be seen that the operator may, by moving the rod 19, readily and easily control the movements of the machine to properly guide it in its work.

Bearing members 23' are carried by the pivoted frame 16 and support the shaft 24 that is supplied with a beveled pinion 25 meshing with beveled pinion 26 so that rotary movement of the shaft 12 is imparted to the shaft 24.

At the end of the shaft 24 is a balance wheel 27, while at the opposite end of the shaft 24 is an eccentric 28 to which the connecting rod 29 is connected. The connecting rod 29 is also pivotally connected to the movable cutter bar 30 through the medium of the arm 31 so that rotary movement of the shaft 24 is converted into a reciprocatory movement for operating the cutter bar.

The reference character 32 indicates the lower section of the cutter bar and, as shown, is pivotally connected to the frame 16 at 33 whereby the cutter bar may be swung in a vertical plane to various positions with respect to the machine. This cutter bar includes an arm 34 which is relatively long and extends to a point adjacent to the opposite side of the body of the machine when the cutter bar is operating in a horizontal plane.

Associated with the arm 34 is an upwardly curved bracing member 35 which has one end thereof formed into a support 36 so that when the cutter bar is moved to a position to operate in a vertical plane, the cutter bar will be supported and held rigidly with respect to the body of the machine. In order that the cutter bar will be held in its vertical position, openings 37 are provided in the member 35 for the reception of the pin 38.

From the foregoing it will be obvious that due to this construction, the cutter bar will be moved to a position to operate either in a horizontal plane or a vertical plane, to the end that the top as well as the sides of the hedge may be readily cut with the machine.

At the rear end of the machine are upwardly extended arms 39 which are provided with notches 40 for the reception of the bar 41 that is carried by the pivoted frame 16, the bar acting as a means to support the frame 16 in various positions of vertical adjustment to gauge the cutting depth of the cutter bar.

I claim:—

1. A hedge trimming machine embodying a wheel-supported frame having upwardly extended arms at the rear thereof, said arms being provided with notches, a frame mounted on the wheel-supported frame and having its forward end pivotally connected to the first mentioned frame adjacent to the forward end of the wheel-supported frame, actuating mechanism mounted on the second mentioned frame, a cutter bar operated by the cutter bar actuating mechanism, and a movable bar carried by the second mentioned frame and adapted to be moved into the notches of the upstanding arm to adjust the second mentioned frame vertically.

2. A hedge trimming machine embodying a wheel-supported frame having upwardly extended arms at the rear thereof, an auxiliary pivoted frame mounted above the wheel-supported frame and connected thereto, a cutter bar actuating mechanism carried by the auxiliary frame, a cutter bar operated by the cutter bar actuating mechanism and extending laterally therefrom in a horizontal plane, and means for adjusting the auxiliary frame vertically to adjust the cutter bar.

3. A hedge trimming machine comprising a wheel-supported frame, an auxiliary frame supported by the first mentioned frame, a cutter bar actuating mechanism carried by the second mentioned frame, a cutter bar operated by the actuating mechanism and extending laterally from the machine, means for adjusting the auxiliary frame vertically to raise or lower the saw in a horizontal plane, and adjustable means on the auxiliary frame for holding the cutter in a vertical position.

In testimony that I claim the foregoing as my own, I have hereto affixed my signature.

JOSEPH G. HIMLER.